2,777,293
FILLING ATTACHMENT FOR HYDRAULIC BRAKE MASTER CYLINDER

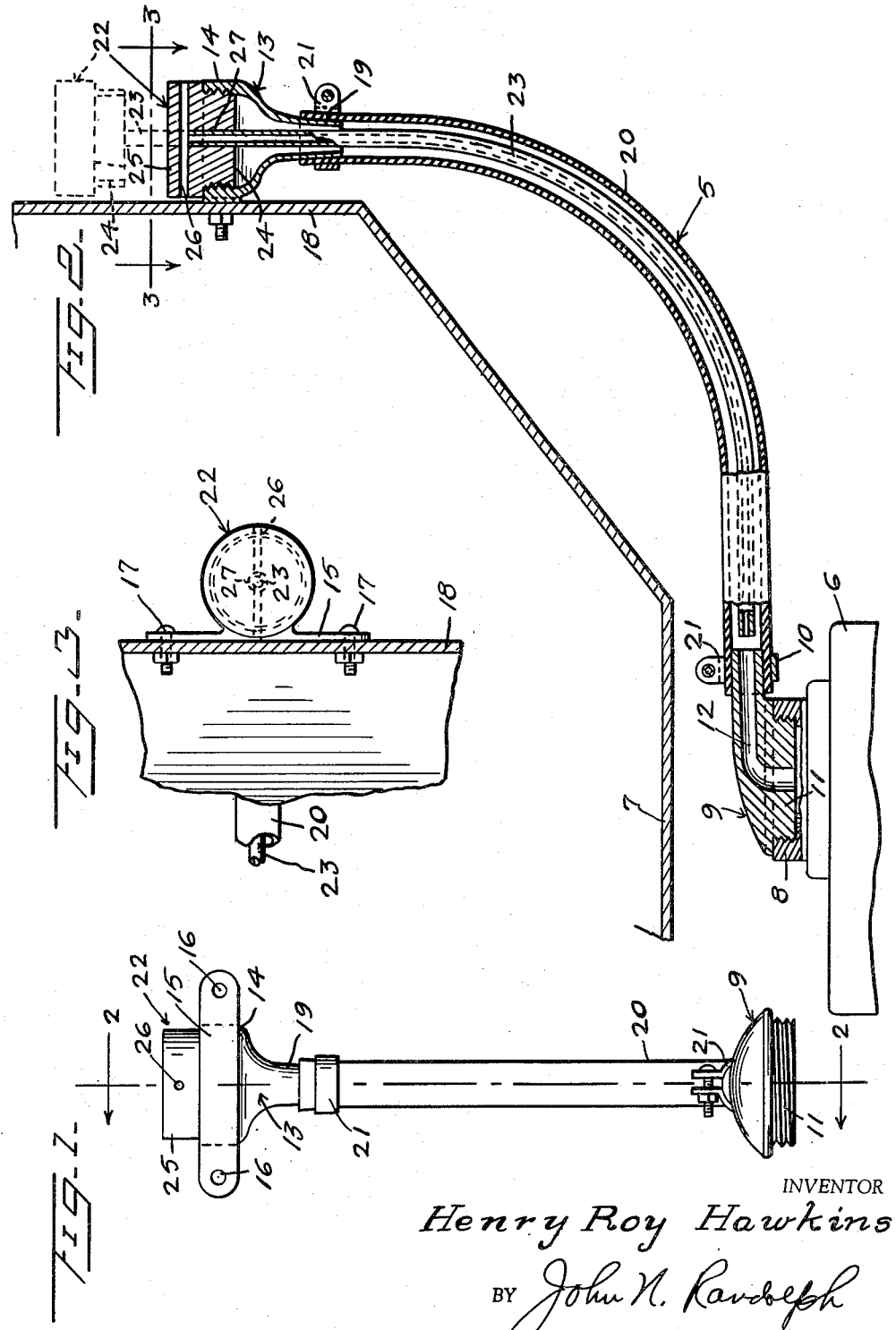

Henry Roy Hawkins, Ramhurst, Ga.

Application May 9, 1956, Serial No. 583,688

4 Claims. (Cl. 60—54.6)

This invention relates to a novel filling attachment for use with master cylinders of hydraulic brakes of motor vehicles which are located beneath the floor board, to greatly facilitate refilling of the master cylinder and of checking by visual inspection to determine when refilling is required.

A further object of the invention is to provide an attachment which will insure proper venting of the master cylinder and will additionally prevent grit and dirt entering the master cylinder and damaging the working parts thereof.

Still another object of the invention is to provide an attachment of extremely simple construction which may be quickly applied to a conventional master cylinder, which can be economically manufactured and sold, and which will be very durable and efficient in use.

Other objects and advantages of the invention will hereinafter become more fully apparent from the following description of the drawing, illustrating a presently preferred embodiment thereof, and wherein:

Figure 1 is a front elevational view of the attachment;

Figure 2 is a vertical sectional view, partly in elevation, showing the attachment in an applied position and taken substantially along a plane as indicated by the line 2—2 of Figure 1, and Figure 3 is a horizontal sectional view, taken substantially along a plane as indicated by the line 3—3 of Figure 2.

Referring more specifically to the drawing, the master cylinder filling attachment in its entirety and comprising the invention is designated generally 5 and is adapted for use with a master cylinder of a hydraulic brake system, a portion of which is shown at 6, and which master cylinder is located beneath a vehicle floor board 7. The upper portion of the master cylinder 6 as shown in Figure 2 includes the internally threaded filling opening 8 thereof.

The attachment 5 includes an externally threaded cap-like fitting 9 which is threadedly mounted in the filling opening 8 in place of the conventional vented closure cap, not shown. The fitting 9 is provided with a restricted extension forming a stem 10 which extends laterally from the upper portion of said fitting and which is disposed at substantially a right angle to the axis of the portion 11 of the fitting 9, which threads into the filling opening 8. The fitting 9 is provided with a bore 12 one end of which opens downwardly through the portion 11 into the hydraulic cylinder 6, and the other end of which opens outwardly through the stem 10.

The attachment 5 also includes a funnel member 13 having an internally threaded open upper end portion 14. A bar 15 is secured intermediate of its ends to a portion of the periphery of the upper funnel portion 14 and provides a mounting bracket having fastening receiving openings 16 adjacent the ends thereof. The mounting bracket 15 is adapted to be disposed against a substantially vertical surface and to be secured thereto for supporting the upper end of the attachment 5, and which vertical surface may comprise a portion of the firewall of a vehicle or the inner panel of a front fender. In Figures 2 and 3, the bracket 15 is shown secured by fastenings 17 which extend through the openings 16 thereof to the forward side of the firewall 18 of the vehicle, so that the funnel shape member 13 is located under the hood of the vehicle with its end portion 14 opening upwardly. The funnel member 13 which is hollow from end-to-end thereof has a restricted lower outlet end 19. One end of a flexible tube fits snugly over the funnel end 19 and the other end of said tube engages snugly over the stem 10. Said tube ends are clamped to the portions 10 and 19 by adjustable split clamping rings 21. The tube 20 is of a length to extend between the portions 10 and 19 and is formed of a material which is impervious to hydraulic fluids, such as rubber or certain plastics.

The attachment 5 also includes a closure cap 22 and a flexible vent tube 23. The cap 22 has a restricted externally threaded lower portion 24 which threadedly engages in the upper funnel portion 14 and an upper portion 25 which is disposed above said funnel portion 14. Said cap portion 25 has a bore 26 extending diametrically therethrough. The cap 22 is also provided with a bore 27, of larger diameter than the bore 26. The bore 27 is disposed perpendicular to the bore 26 and has an upper end opening into the intermediate portion of the bore 26 and a lower end opening downwardly through the lower cap portion 24. An upper end of the tube 23 is secured in the bore 27 and communicates with the bore 26. The tube 23 may be formed of a material corresponding to the material of the tube 20 and is of an external diameter substantially less than the diameter of the bore of the tube 20, so as to fit loosely therein, as seen in Figure 2. The tube 23 is of a length to extend to adjacent the stem 10 when the cap portion 24 is secured in the funnel portion 14, as seen in Figure 2.

For refilling the master cylinder 6, the cap 22 is unscrewed from the funnel portion 14 and raised to approximately its dotted line position of Figure 2 so that a hydraulic fluid can be poured into the open funnel end 14 to flow downwardly through said funnel 13, the tube 20 and bore 12 for refilling the master cylinder 6. During this operation, air in the master cylinder, the bore 12 and tube 20 will escape to the atmosphere upwardly through the vent tube 23 and thence through the bore 26 so that the downward flow of the hydraulic fluid will not be impeded. It will be apparent that the funnel member 13 can be conveniently disposed to greatly simplify the refilling of a master cylinder which is located under the floor board of a vehicle.

After refilling of the master cylinder has been completed, the cap 22 is again threadedly connected to the funnel member 13 as seen in Figure 2. While the master cylinder 6 is in operation the tube 23 and vent passage 26 will function for venting air to the atmosphere from the master cylinder to prevent an air lock being created therein and will also act to prevent the building up of a vacuum in the master cylinder. The vent passage has two outlet ends as defined by the two ends of the bore 26 which are located substantially above the level of the master cylinder and which are thus protected from dirt and grit thrown up by the vehicle wheels. Thus, the chance of the vent passage portion 26 becoming clogged and not functioning or the possibility of dirt or grit reaching the master cylinder through the vent passage is reduced to a minimum.

If desired, the vent tube 23 may also be utilized as a dip stick for indicating the level of the hydraulic fluid in the attachment 5 and for indicating when no fluid is contained within the tube 20.

Various modifications and changes are contemplated and may obviously be resorted to, without departing from the spirit or scope of the invention as hereinafter defined by the appended claims.

I claim as my invention:

1. A filling attachment for a hydraulic brake master cylinder comprising a fitting adapted to engage in the filling opening of a hydraulic brake master cylinder, said fitting having a restricted extension in an upper portion thereof forming a stem and being provided with a bore having one end opening through said stem and an opposite end opening through a portion of the fitting disposed in the filling opening and adapted to communicate with the interior of the hydraulic cylinder, a funnel shape member having an enlarged open upper end and a restricted open lower end, means supporting said funnel shape member in a position remote from and above the level of said fitting, a conduit connecting the funnel member and fitting having one end engaging the restricted lower end of the funnel member and an opposite end engaging the stem of the fitting, and a cap for closing the open upper end of the funnel member, said cap being detachably connected to the funnel member and having venting means opening therefrom to the atmosphere, a tube forming a part of said vent means having one end extending into said cap and connected thereto, said cap having a bore, forming a part of said vent means and extending transversely therethrough and disposed above the level of the funnel member and having ends opening outwardly of the cap and an intermediate portion communicating with said tube end, said tube extending downwardly from the cap and fitting loosely in the funnel member and conduit and having an opposite end opening into said conduit remote from the funnel member.

2. A filling attachment as in claim 1, said vent tube and conduit each being formed of a flexible material impervious to hydraulic fluids.

3. A filling attachment for a hydraulic brake master cylinder comprising a fitting adapted to engage in the filling opening of a hydraulic brake master cylinder, said fitting having a restricted extension in an upper portion thereof forming a stem and being provided with a bore having one end opening through said stem and an opposite end opening through a portion of the fitting disposed in the filling opening and adapted to communicate with the interior of the hydraulic cylinder, a funnel shape member having an enlarged open upper end and a restricted open lower end, means supporting said funnel shape member in a position remote from and above the level of said fitting, a conduit connecting the funnel member and fitting having one end engaging the restricted lower end of the funnel member and an opposite end engaging the stem of the fitting, and a cap for closing the open upper end of the funnel member, said cap being detachably connected to the funnel member and having venting means opening therefrom to the atmosphere, said supporting means comprising a bracket having an intermediate portion secured to the funnel member and end portions provided with fastening receiving openings, and fastenings engaging said openings and adapted to be anchored to a vehicle portion which is disposed in a readily accessible position.

4. A filling attachment for a hydraulic brake master cylinder comprising an elongated conduit including an upper end and a lower end, a funnel shape member defining the upper end of said conduit and the inlet end thereof, mounting means adapted to support said funnel shape member and the upper end of the conduit on a part of a motor vehicle and in a readily accessible position for supplying a hydraulic fluid to the attachment through said upper end of the conduit, a fitting adapted to be detachably mounted in the filling opening of a hydraulic brake cylinder and constituting the lower end of said conduit and opening into the brake cylinder, a closure detachably connected to the upper end of the funnel shape member, and a vent tube formed of a flexible material having one end secured to said closure, said vent tube extending downwardly from the closure and being loosely disposed in said conduit and extending to adjacent the lower end thereof, and said closure having a bore in the upper portion thereof opening to the atmosphere and communicating with said vent tube.

References Cited in the file of this patent

UNITED STATES PATENTS

| | | |
|---|---|---|
| 2,625,267 | Alexander | Jan. 13, 1953 |
| 2,661,847 | Buettner | Dec. 8, 1953 |